US010336259B2

(12) United States Patent
Michie et al.

(10) Patent No.: US 10,336,259 B2
(45) Date of Patent: Jul. 2, 2019

(54) STEP RAIL FOR VEHICLE WITH APPLIQUE AND METHOD OF MAKING SAME

(71) Applicant: JAC Products, Inc., Saline, MI (US)

(72) Inventors: Gordon Michie, LaSalle (CA); Michael F. Wood, Brighton, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/699,386

(22) Filed: Sep. 8, 2017

(65) Prior Publication Data

US 2018/0065559 A1 Mar. 8, 2018

Related U.S. Application Data

(60) Provisional application No. 62/384,986, filed on Sep. 8, 2016.

(51) Int. Cl.
*B60R 3/00* (2006.01)
(52) U.S. Cl.
CPC .................................... *B60R 3/002* (2013.01)
(58) Field of Classification Search
CPC ........... B60R 3/002; B60R 3/04; B60R 3/007; B60Q 1/2661
USPC .................................................. 280/169, 163
See application file for complete search history.

(56) References Cited

U.S. PATENT DOCUMENTS

| | | | |
|---|---|---|---|
| 1,310,973 A | | 7/1919 | Schrenk |
| 1,334,565 A | * | 3/1920 | Spiro ...................... B60R 3/002 280/169 |
| 1,503,773 A | * | 8/1924 | Stanwood .............. B61D 23/00 280/169 |
| 1,835,188 A | * | 12/1931 | Ritz Woller .............. B60R 3/00 280/163 |
| 1,860,654 A | * | 5/1932 | Cavanagh ............... B60R 3/002 280/163 |
| 4,426,028 A | | 1/1984 | Bolt |
| 4,721,319 A | * | 1/1988 | Dale ....................... B60R 3/007 182/92 |
| 4,800,470 A | | 1/1989 | Hartsaw |
| 4,943,085 A | * | 7/1990 | Straka ...................... B60R 3/00 182/92 |
| 5,193,829 A | * | 3/1993 | Holloway ............... B60R 3/002 280/163 |
| 5,286,049 A | | 2/1994 | Khan |
| 5,347,434 A | | 9/1994 | Drake |
| 5,422,794 A | | 6/1995 | Drake |

(Continued)

*Primary Examiner* — James A Shriver, III
*Assistant Examiner* — Brian L Cassidy
(74) *Attorney, Agent, or Firm* — Harness, Dickey & Pierce, P.L.C.

(57) ABSTRACT

An accessory component for a vehicle is disclosed which may incorporate an elongated frame element having an elongated channel formed there along. The elongated frame element is adapted to be fixedly secured to a portion of the vehicle. A resilient metallic applique having a contour generally in accordance with at least a portion of the elongated frame element may be incorporated. The applique may have a feature adjacent a first end for engaging with the elongated channel, and a second end of the applique may be shaped to engage with a different portion of the elongated frame element such that the applique is secured to the elongated frame element without adhesives or mechanical fasteners.

10 Claims, 5 Drawing Sheets

(56) References Cited

U.S. PATENT DOCUMENTS

| | | | |
|---|---|---|---|
| 5,713,589 A * | 2/1998 | Delgado | B60R 3/00 182/190 |
| 6,114,954 A | 9/2000 | Palett et al. | |
| 6,267,398 B1 | 7/2001 | Lombard | |
| 6,520,523 B2 | 2/2003 | Beck | |
| 6,550,414 B1 | 4/2003 | Correll et al. | |
| 6,588,782 B2 * | 7/2003 | Coomber | B60R 3/002 280/163 |
| 6,592,135 B2 | 7/2003 | Hendrix | |
| 6,682,132 B1 | 1/2004 | Hahn | |
| 6,702,370 B2 | 3/2004 | Shugar et al. | |
| 6,827,532 B1 | 12/2004 | Nix | |
| D521,439 S | 5/2006 | Chapman et al. | |
| 7,081,810 B2 | 7/2006 | Henderson et al. | |
| 7,083,179 B2 | 8/2006 | Chapman et al. | |
| 7,377,674 B2 | 5/2008 | Klinkman et al. | |
| 7,637,518 B2 | 12/2009 | Adair | |
| 7,708,294 B2 | 5/2010 | Demick | |
| 7,717,445 B2 | 5/2010 | Peterson et al. | |
| 8,002,299 B2 * | 8/2011 | Huang-Tsai | B60R 3/00 280/163 |
| 8,016,309 B2 * | 9/2011 | Flajnik | B60R 3/002 280/163 |
| 8,414,168 B2 | 4/2013 | Jutila et al. | |
| 8,448,968 B1 * | 5/2013 | Grote | B60R 3/002 280/163 |
| 8,596,662 B2 * | 12/2013 | Huang-Tsai | G05G 1/483 280/163 |
| 8,657,318 B2 * | 2/2014 | Chen | B60R 3/002 280/163 |
| 9,409,520 B1 * | 8/2016 | Wang | F16B 5/126 |
| 9,527,435 B2 | 12/2016 | Michie et al. | |
| 2003/0006576 A1 * | 1/2003 | Lanoue | B60R 3/002 280/163 |
| 2003/0160417 A1 * | 8/2003 | Kayne | B60R 3/002 280/163 |
| 2004/0150183 A1 * | 8/2004 | Clermont | B60R 3/002 280/163 |
| 2004/0256832 A1 * | 12/2004 | Bradsen | B60R 3/002 280/163 |
| 2005/0012295 A1 * | 1/2005 | Chevalier | B60R 3/002 280/163 |
| 2005/0212249 A1 | 9/2005 | Lopez | |
| 2006/0114685 A1 * | 6/2006 | Seeber | B60Q 1/323 362/495 |
| 2007/0138757 A1 * | 6/2007 | Kuntze | B60R 3/002 280/163 |
| 2007/0205240 A1 | 9/2007 | Castro et al. | |
| 2007/0217212 A1 | 9/2007 | Klinkman et al. | |
| 2008/0128187 A1 | 6/2008 | Hu | |
| 2008/0258421 A1 * | 10/2008 | Crandall | B60R 3/002 280/163 |
| 2009/0044729 A1 | 2/2009 | Navarre et al. | |
| 2011/0084102 A1 | 4/2011 | Sautter et al. | |
| 2011/0174855 A1 | 7/2011 | Carothers et al. | |
| 2011/0240695 A1 | 10/2011 | Aftanas | |
| 2012/0031939 A1 | 2/2012 | Jutila et al. | |
| 2013/0106135 A1 | 5/2013 | Praskovsky et al. | |
| 2014/0027996 A1 * | 1/2014 | Chen | B60R 3/002 280/163 |
| 2014/0313343 A1 | 10/2014 | Frank et al. | |
| 2015/0180178 A1 | 6/2015 | Ranka et al. | |

* cited by examiner

STEP RAIL FOR VEHICLE WITH APPLIQUE AND METHOD OF MAKING SAME

CROSS-REFERENCE TO RELATED APPLICATIONS

This application claims the benefit of U.S. Provisional Application No. 62/384,986, filed Sep. 8, 2016. The entire disclosure of the above application is incorporated herein by reference.

FIELD

The present disclosure relates to step rails or step bars used to aid with ingress and egress into and out from a vehicle interior, such as a SUV, van, truck, etc., and more particularly to a step rail having a construction involving the use of a Bright applique over a frame-like element, and a method of making same that eliminates the need and cost of a chrome plating operation.

BACKGROUND

The statements in this section merely provide background information related to the present disclosure and may not constitute prior art.

Step rails are used on many different types of vehicles, for example SUVs, vans, mini-vans, pickup trucks. Often it is important to provide not only a sturdy step rail that can easily handle the weight of one or more occupants at a time, but a step rail that has a pleasing appearance. Typically, one or more distinct portions of present day step rails are chrome plated to provide an aesthetically pleasing appearance. However, a chrome plating operation adds significant cost to the step rail, and in some cases may make up 50% or more of the total cost of manufacture of the step rail. Chrome plating also involves the use of caustic materials and processes that must be carefully managed. The scrap rate of chrome plating is also relatively high, which adds to the overall cost of a mass produced product.

It would therefore be a highly desirable to provide a step rail and a construction therefore which is able to provide a robust design, with an equally aesthetically appealing appearance, and without requiring the use of chrome plating.

SUMMARY

This section provides a general summary of the disclosure, and is not a comprehensive disclosure of its full scope or all of its features.

In one aspect the present disclosure relates to an accessory component for a vehicle. The accessory component may incorporate an elongated frame element having an elongated channel formed there along. The elongated frame element is adapted to be fixedly secured to a portion of the vehicle. A resilient metallic applique may be included which has a contour generally in accordance with at least a portion of the elongated frame element. The applique may have a feature adjacent a first end for engaging with the elongated channel. A second end of the applique may be shaped to engage with a different portion of the elongated frame element such that the applique is secured to the elongated frame element without adhesives or mechanical fasteners.

In another aspect the present disclosure relates to an accessory component for a vehicle that makes use of an elongated frame element. The elongated frame element may have an elongated semi-circular channel formed co-extensively there with, and at least at least one bracket secured to the elongated frame element. The bracket is adapted to be secured to a frame portion of the vehicle and supports the elongated frame element along a portion of the vehicle. A resilient metallic applique is included which has a contour generally in accordance with at least a portion of the elongated frame element. The applique has a curved portion adjacent a first end for engaging with the elongated channel. A second end of the applique is shaped to engage with a different portion of the elongated frame element. In this manner the applique is able to be secured to the elongated frame element with a snap fit, and thus does not require adhesives or independent mechanical fasteners.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
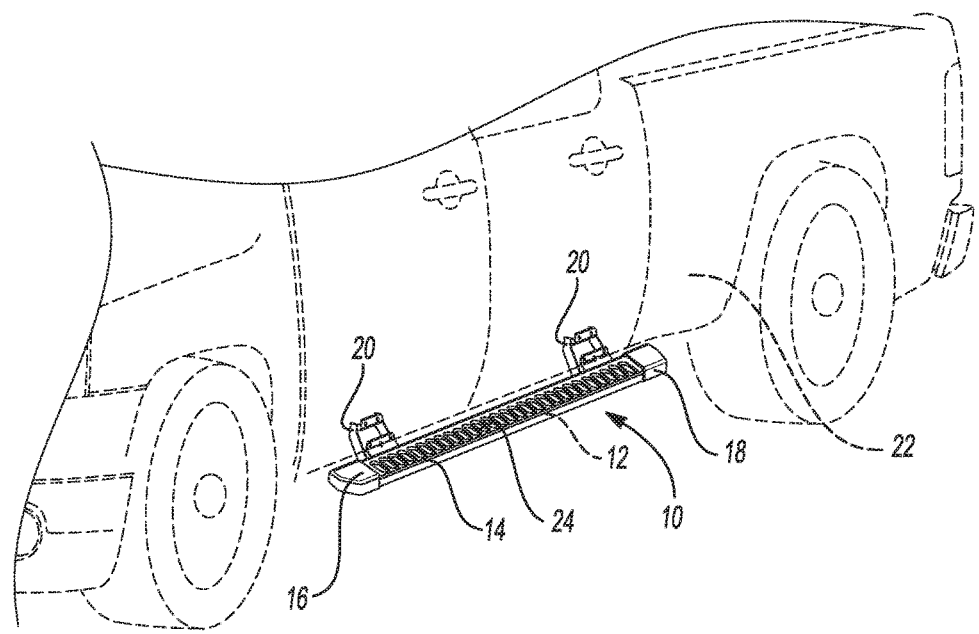
FIG. 1 is a perspective view a step rail in accordance with one embodiment of the present disclosure.

The following description is merely exemplary in nature and is not intended to limit the present disclosure, application, or uses.

It should be understood that throughout the drawings, corresponding reference numerals indicate like or corresponding parts and features.

Referring to FIG. 1 an accessory component in the form a vehicle step rail 10 is shown in accordance with one embodiment of the present disclosure. In this example the accessory component forms a step rail for use with a motor vehicle, for example a pickup truck, SUV, minivan, full size van, etc. However, it will be appreciated that the teachings of the present disclosure may be used to form other types of accessory components (e.g., grab rails) where a polished looking, decorative finish is desired. As such, the teachings described herein may even be used in connection with vehicle bumpers, vehicle mirrors, vehicle roof rack elements, etc., and therefore the teachings presented herein are not limited solely to use with vehicle step rails.

In FIG. 1 the example vehicle step rail 10 may include an elongated frame element 12 (obscured in FIG. 1), an applique 14, a front end cap 16, a rear end cap 18, and a number of brackets 20 for securing the step rail 10 to a frame or body portion (not shown) of a vehicle 22. A plurality of plastic, elastomeric or rubber pad members 24 may be secured to the applique to help provide a non-slip surface to further ease ingress into, and egress from, the vehicle interior. The end caps 16 and 18 may be telescopically fitted into the opposing ends of the frame element 12 and each may be held fixedly secured therein one of a plurality of threaded fasteners 34.

Figure 2:
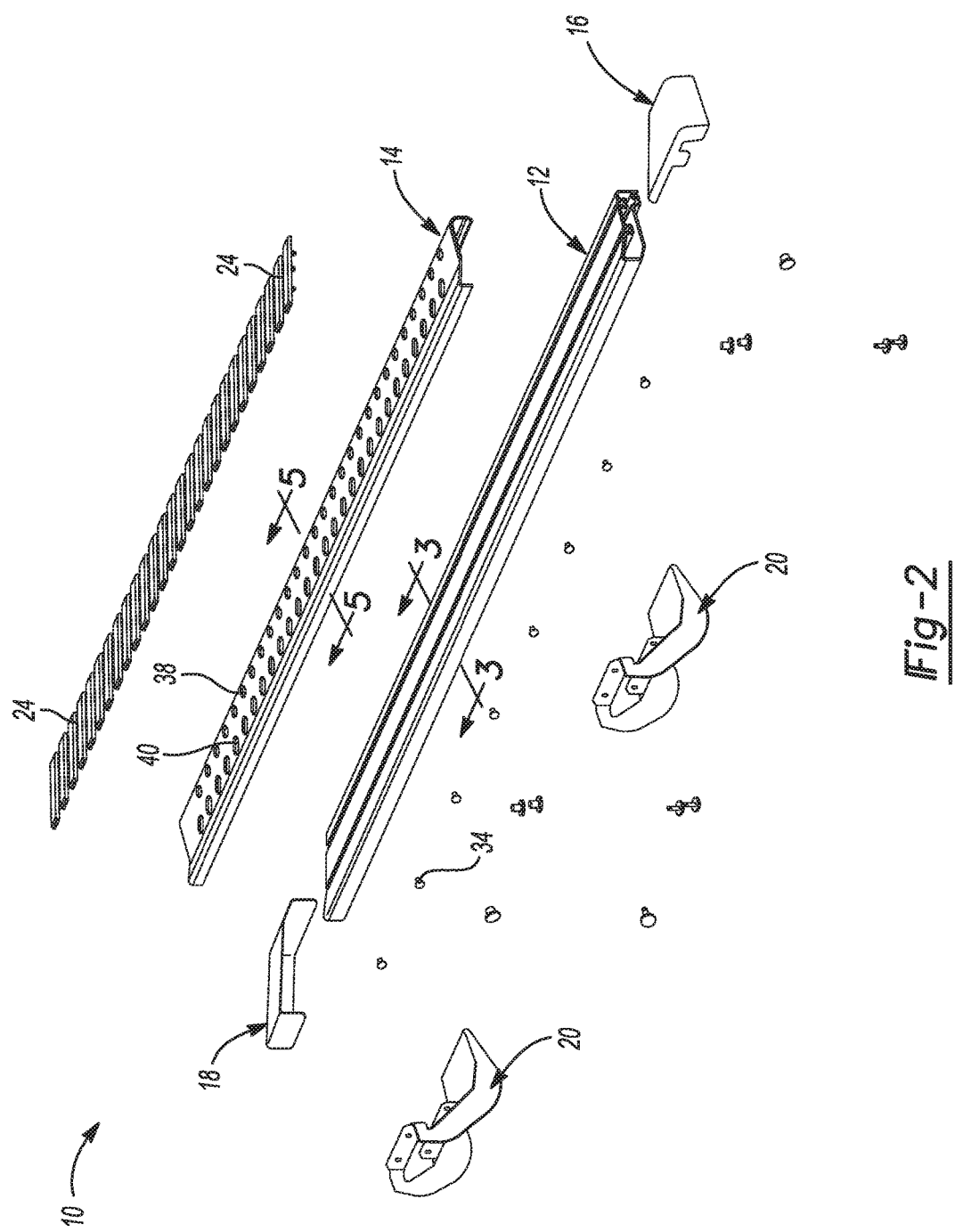
FIG. 2 is an exploded perspective view of the major components of the step rail of FIG. 1.

Referring to FIG. 2, the step rail 10 is shown in exploded perspective fashion. In this example the frame element 12 forms an extruded aluminum component. However, the frame element 12 could instead be formed from a roll forming process or any other forming process which is capable of producing an elongated, structurally strong component suitable for supporting the weight of one or more individuals. Aluminum is a preferred material because of its relatively high strength and light weight, but steel could also be used, and the frame element 12 is not limited to use with any specific material. The frame element 12 may also be heat treated.

Figure 3:
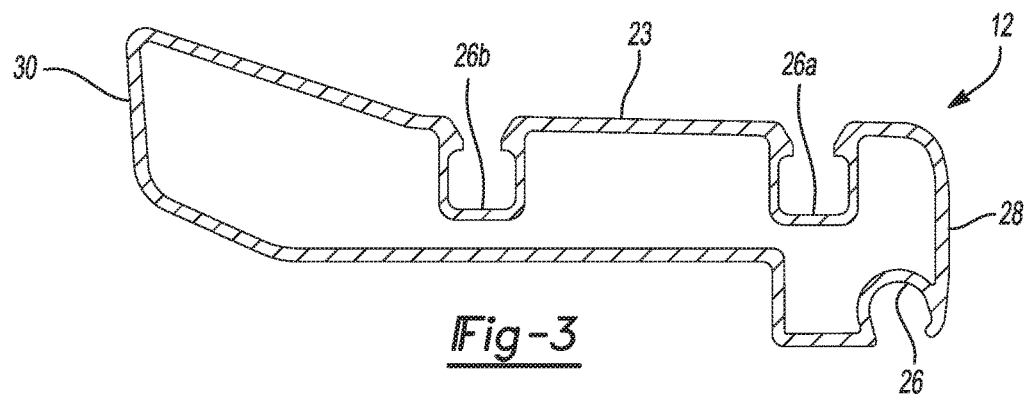
FIG. 3 is a side cross sectional view of the frame element shown in FIG. 2 taken in accordance with section line 3-3 in FIG. 2.

The step rail 10, as best shown in FIG. 3, may include an upper surface 23 having a plurality of elongated channels 26a and 26b for engaging portions of the pad members 24, as will be described more fully in the following paragraphs. A semi-circular channel 27 is formed along a forward edge 28 of the frame element 12 for engaging with a leading edge portion of the applique 14. A rear surface 30 is used for attaching a trailing edge surface of the applique 14 to the frame element 12. The rear surface 30 may include a hole 32 at each end for enabling one of the fasteners 34 (visible in FIG. 1) to be used to hold each of the end caps 16 and 18 within the opposing end portions of the frame element 12. While the frame element 12 is shown as a single piece component, it will be appreciated that it could be formed from two or more distinct components that are fixedly secured together.

Figure 4:
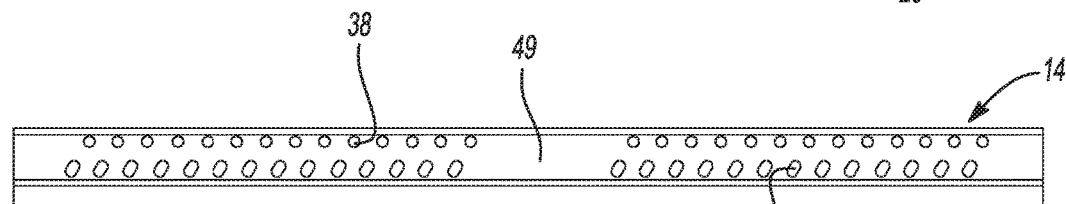
FIG. 4 is a plan view of the applique shown in FIG. 2.
Figure 5:
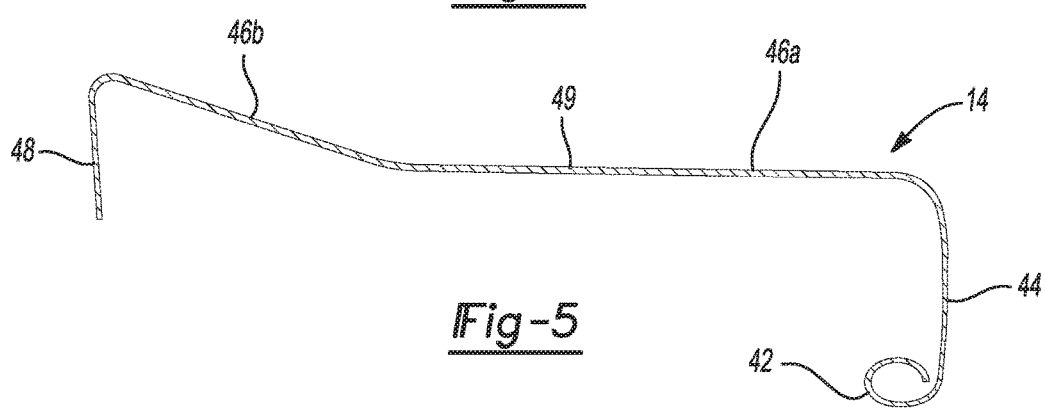
FIG. 5 is a side cross sectional view of the applique shown in FIG. 2 in accordance with section line 5-5 in FIG. 2.
Figure 6:
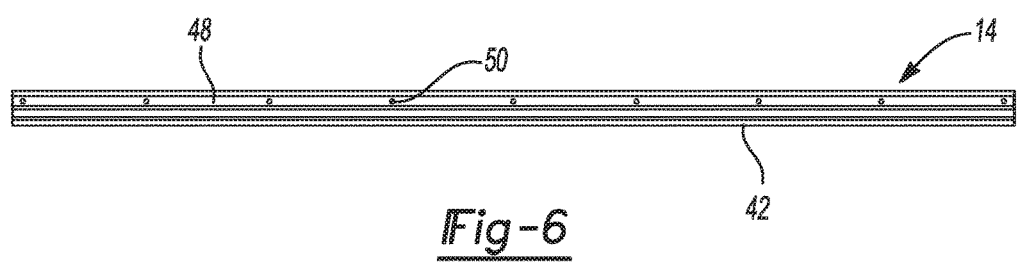
FIG. 6 is a rear view of the applique shown in FIG. 5.

Referring to FIGS. 4-6, the applique 14 is shown in greater detail. The applique 14 may be formed from aluminum or stainless steel and can have a highly polished outer surface which provides the appearance of being chrome plated. Other manufacturing possibilities for generating appearance differences include brushing, blasting and other impingement techniques. The applique 14 also has pluralities of holes 38 and 40 for accepting portions of the pads 24. The holes 38 and 40 are shown having different shapes, which helps to "key" attachment of the pads 24 in one orientation only when the pads 24 are being installed on the frame element 12. It is a principal benefit of the step rail 10 that the highly polished outer surface 36 of the applique 14 is virtually indistinguishable from a chrome plated surface but is formed without incurring the cost and manufacturing complexity, and other drawbacks, of a traditional chrome plating process.

FIG. 5 shows the applique 14 in cross section. The applique 14 has an overall contour that matches that of the frame element 12. The applique 14 includes a curved circular lip 42, a forward edge surface 44, a top surface 46a, an upwardly sloping upper portion 46b and a rear surface 48. An outer surface 49 of the applique 14 forms the highly polished surface portion.

The curved circular lip 42 may be inserted into the semi-circular channel 27 and snaps therein during assembly, thus avoiding the use of adhesives or threaded fasteners. The holes 38 and 40 are formed to be aligned with the channels 26a and 26b, respectively, when the applique 14 is assembled to the frame element 12. An additional plurality of holes 50 may be formed along the rear surface 48. When positioned on the frame element 12, the applique 14 lays over the upper surface 23 of the frame element 12 and the rear surface 48 of the applique 14 rests against the rear surface 30 of the frame element, and thus forms what amounts to an outer skin for a major portion of the exterior surface of the frame element 12. The fasteners 34 shown in FIG. 1 may be inserted through the holes 50 in the rear surface 48 of the applique 14 into preformed holes (not shown in the rear surface 34) to thus secure the rear surface 48 of the applique 14 to the rear surface 30 of the frame element 12.

Figure 7:
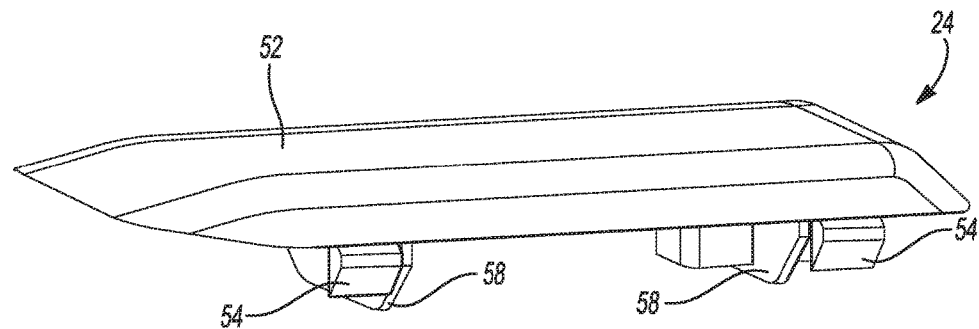
FIG. 7 is an enlarged perspective view of one of the pads shown in FIG. 2.
Figure 8:
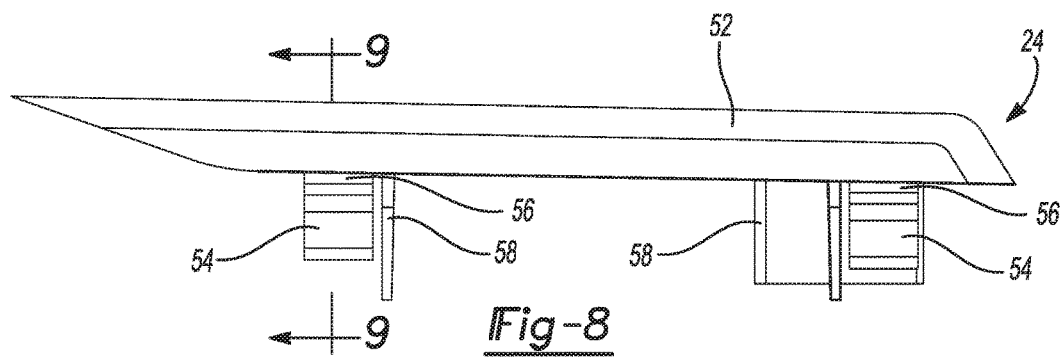
FIG. 8 is a side view of the pad shown in FIG. 7.
Figure 9:
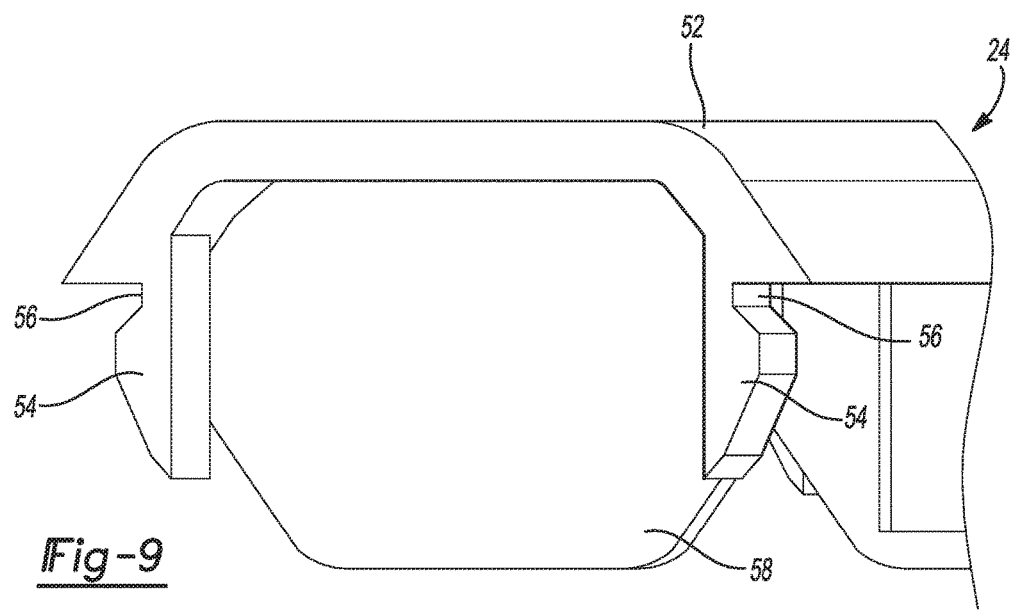
FIG. 9 is a cross sectional view through the pad of FIG. 8 taken in accordance with section line 9-9 in FIG. 8.

Referring to FIGS. 7-9, one of the pads 24 is shown in greater detail. Each one of the pads 24 may form a single piece component which includes an upper body portion 52 and a pair of depending tabs 54 that each form a notch 56. The depending tabs 54 may be pushed through an aligned pair 38/40 of the holes and then pressed into the channels 26a and 26b to secure the pad 24 to the frame element 12. The edges of the holes 38 and 40 engage the notches. 56 to prevent removal of the pad 24 once it is assembled to the frame element 12. Advantageously, the pads 24 help to secure the applique 14 firmly to the upper surface 23 of the frame element 12 without the use of adhesives or threaded fasteners. The applique 14 and the pads 24 can thus be secured quickly and without the use of special tools or complex assembly procedures when assembling the step rail 10.

The method of manufacturing the step rail 10 also forms a significant advance in the art. The frame element 12 may initially be formed, for example, using a conventional extrusion process or by using a conventional roll forming process. The applique 14 may initially be formed from a suitably sized piece of highly pre polished, non-corrosive Stainless Steel or brushed/smooth/blasted aluminum in sheet form, for example 0.6 mm-1.5 mm thick. The Stainless Steel may be initially presented with a protective film thereon. The Stainless Steel may be in a coiled form and fed into a stamping press. A section of the Stainless Steel is initially stamped by the stamping press to form all of the holes 38 and 40 in one operation (also called an in-line pre-punch operation). This avoids the need to drill, CNC, laser cut or otherwise form the holes 38 and 40 one at a time, which would be time consuming and expensive from a labor standpoint. Using a stamping press to form the holes 38/40 in one operation also ensures that the holes are precisely formed every time an applique 14 is manufactured. The stamped, polished stainless or aluminum sheet may then be fed through rolls of formed into the precise shape and contour needed to fit onto the frame element 12, with the curved circular lip 42 also being formed during this operation. The forming of the contour of the applique 14 may be by using a conventional roll forming process in which the stamped, polished stainless or brushed/smooth/blasted aluminum sheet is fed through rolls of a roll forming apparatus to form the stamped, polished stainless or brushed/smooth/blasted aluminum sheet into the needed contour. The roll formed sheet may then be cut off at a precise length.

The pads 24 may be formed separately, for example in an injection molding process using a suitable high strength plastic. The pads 24 may also be molded or otherwise formed using an elastomeric material or from rubber.

Figure 10:
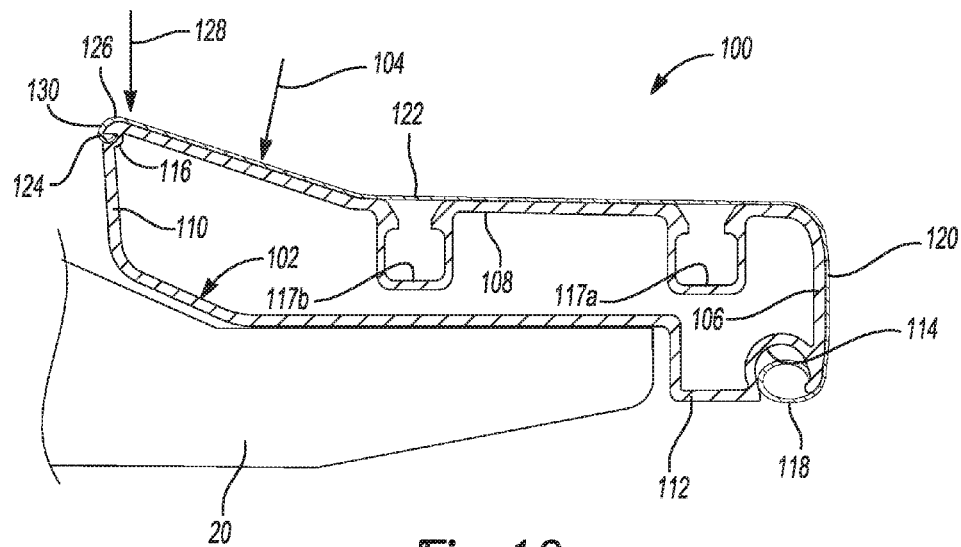
FIG. 10 is a simplified cross sectional drawing of another embodiment of the present disclosure in which an applique is secured along both of its longitudinal edges by a snap-fit to an elongated frame element.

Referring to FIG. 10, a step rail 100 in accordance with another embodiment of the present disclosure is shown. The step rail 100 in this example includes an elongated frame element 102 and an applique 104 which is secured to the frame with any external fastening elements (e.g., without threaded screws). The elongated frame element 102 may be formed in any manner, for example from an extruded section of aluminum, and it may be coated with any suitable coating as well (e.g., powder coated). The frame element 102 includes a front wall 106, a top portion 108, a rear portion 110 and a bottom portion 112. A first semi-circular channel 114 is formed in the bottom portion 112 adjacent a lower edge of the front wall 106, and second channel 116 is formed in the rear portion 110 adjacent the top portion 108. Two longitudinally extending channels 117a and 117b are also formed for receiving the depending tab portions 54 of the pads 24 as described above with the step rail 10. The applique 104 includes a forward curved edge portion 118, a front portion 120, a top portion 122, and a rear curved edge portion 124. The applique 104 also includes openings (not visible in FIG. 10), produced for example by stamping or any other suitable means, just like aligned pair of holes 38/40 discussed above, which receive the depending tab portions 54.

When the applique 104 is to be assembled onto the elongated frame element 102, the forward edge portion 118 is initially press fit into, that is snapped into, the forward semi-circular channel 114. This can be accomplished by an assembly technician without the need for any special tools. Once the forward semi-circular channel 114 is fully engaged with the full length of the semi-circular channel 114, the top portion 122 is articulated so that its top portion 122 lies generally over the top portion 108 of the elongated frame element 102. A surface area 126 adjacent the rear curved edge portion 124 may then be pressed downward in accordance with arrow 128, which causes the rear curved edge portion 124 to be pushed over a rear edge lip 130 of the elongated frame element 102 and to snap into the second channel 116. Thus, the entire applique 104 can be secured to the elongated frame element 102 without the use of any fastening elements, special tools or adhesives. Possibly, the assembly sequence could be reversed such that the rear curved edge portion 124 is secured first, and the forward curved edge portion 118 is secured last. Optionally, one or more beads of adhesive may be deposited on an upper surface of the top portion 108, or along any other surface of the elongated frame element 102 where an undersurface of the applique 104 will make contact with it, prior to installing the applique.

While the channels 114 and 116 have been illustrated with a partial or substantial semi-circular construction, it will be appreciated that the channels may potentially be formed with other cross sectional configurations as well. The important consideration is that the curved portions 118 and 124 of the applique 104 are to engage with a wall or edge portion of a channel so that both curved portions 118 and 124 can be snapped into their respective channels and be retained therein without external fastening elements.

Figure 11:
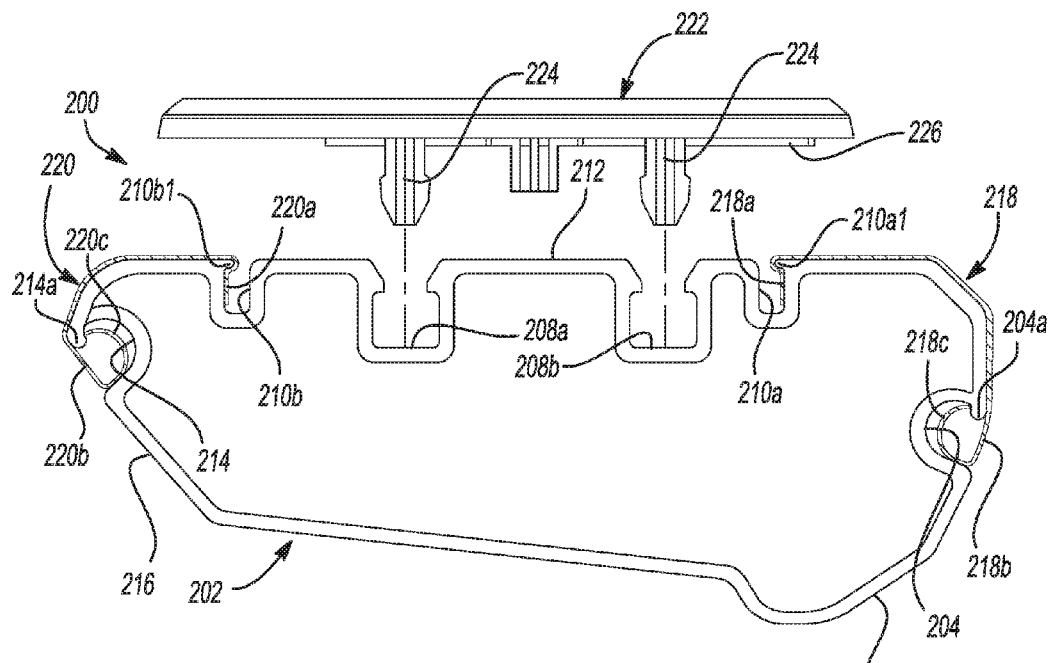
FIG. 11 is a simplified cross sectional drawing of still another embodiment which makes use of two independent.

Referring to FIG. 11, a step rail 200 in accordance with another embodiment of the present disclosure is shown. In this example an elongated frame element 202 is provided which may be made from any suitably strong material, for example high strength plastic or aluminum, and more preferably extruded aluminum. The elongated frame element 202 may include a semi-circular shaped (in cross section) forward edge channel 204 formed along a front surface 206 of the elongated frame element, a first pair of elongated channels 208a and 208b and a second pair of elongated channels 210a and 210b all formed along an upper surface 212 of the elongated frame element. A semi-circular shaped rearward edge elongated channel 214 may be formed along a rear surface 216 of the elongated frame element 202. A first applique 218 may be secured in the forward edge channel 204 and the elongated channel 210a. A fully independent second applique 220 may be installed in channel 210b and the rearward elongated channel 214.

The first applique 218 may include a first leg portion 218a that engages a lip 210a1 of the elongated channel 210a. A curved end portion 218b may engage the forward edge channel 204. Installation of the first applique may be performed by first inserting the first leg portion 218 in the elongated channel 210a so that the first leg portion engages lip 210a1, and then rotating the first applique 218 clockwise in the illustration of FIG. 11 until the curved end portion 218b enters the forward edge channel 204. A snapping action may be required to fully insert the curved end portion 218b as its free end 218c clearly lip 204a of the forward edge channel 204.

The second applique 220 may be inserted in a similar fashion into the channel 210b and the rearward elongated channel 214 by first inserting a leg portion 220a into the channel 210b such that the leg portion 220a engages a lip 210b1 of the channel 210b, and then rotating the entire second applique 220 counterclockwise until a curved end portion 220b enters the rearward edge elongated channel 214, and its free end 220c clears a lip 214a of the rearward elongated channel 214 with a snapping-like engagement action.

Optionally, but preferably, the step rail 200 may also include an upper pad 222 having at least one, but preferably a plurality, of projecting conventional Christmas-tree style fastening posts 224 protruding from an undersurface 226 thereof. The fastening posts 224 enable the upper pad 222 to be secured to the upper surface 212 of the elongated frame element 202 by simply pressing the fastening posts 224 into the channels 208a and 208b. The upper pad 222 may be made from rubber, plastic or any other suitable material that provides increased traction when an individual steps on the step rail 200 to enter a vehicle.

The first and second appliques 218 and 220 may be made from brushed/smooth/blasted stainless steel, or from polished aluminum or any other material having a degree of resiliency and preferably a shiny, chrome-like appearance. Aluminum and stainless steel are metallic materials that are especially highly preferred because when brushed/smooth/blasted (i.e., generally speaking highly polished), they look similar to chrome.

The method of attaching the first and second appliques 218 and 220 is especially advantageous because the appliques 218 and 220 can be attached without any messy or toxic adhesives or external fasteners, and without special tools. Assembly of the appliques 218 and 220 to the elongated frame element 202 can be made quickly, typically within just minutes or less. If either applique 218 or 220 is damaged, the method of assembly described herein would permit one or the other to be easily replaced.

The above manufacturing sequence may be varied and is not limited to having the above-described manufacturing operations performed in the exact order as described above. For example, the polishing of the aluminum sheet that forms the applique 14 may be performed after the stamping operation. Regardless of the exact sequence of manufacturing operations, the applique 14 has a chrome-like appearance that is virtually indistinguishable from a chrome plated surface. But since chrome plating is avoided, the step rail 10 can be manufactured significantly more economically than if conventional chrome plating was used on the applique 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An accessory component for a vehicle, comprising:
    an elongated frame element having an elongated first feature formed there along, the elongated frame element adapted to be fixedly secured to a portion of the vehicle;
    a resilient metallic applique having a contour generally in accordance with at least a portion of the elongated frame element;
        the applique having a second feature adjacent a first end for engaging with the elongated first feature, and a second end of the applique being shaped to engage with a different portion of the elongated frame element such that the applique is secured to the elongated frame element without adhesives or mechanical fasteners;
    the applique having at least one hole;
    the elongated frame element further comprises at least one channel formed in an upper surface thereof; and
    a pad including at least one depending tab, the hole in the applique enabling the depending tab to pass therethrouqh, and the depending tab configured to engage with the at least one channel in the upper surface of the elongated frame element while sandwiching at least a portion of the applique between the pad and the elongated frame element.

2. The accessory component of claim 1, wherein the accessory component comprises a step rail.

3. The accessory component of claim 1, wherein the second feature of the applique adjacent the first end comprises a curved end portion.

4. The accessory component of claim 1, wherein the first feature comprises an elongated channel having a semicircular shape.

5. The accessory component of claim 1, wherein the applique includes a plurality of holes formed therein.

6. An accessory component for a vehicle, comprising:
    an elongated frame element having an elongated semicircular channel formed co-extensively there with;
    at least one bracket secured to the elongated frame element and adapted to be secured to a frame portion of the vehicle, for supporting the elongated frame element along a portion of the vehicle;
    a resilient metallic applique having a contour generally in accordance with at least a portion of the elongated frame element;
    the applique having a curved portion adjacent a first end for engaging with the elongated channel, and a second end of the applique being shaped to engage with a different portion of the elongated frame element such that the applique is secured with a snap fit to the elongated frame element without adhesives or mechanical fasteners;
    the applique having a plurality of longitudinally aligned holes;
    the elongated frame element further comprises at least one longitudinally extending channel formed in an upper surface thereof; and
    a pad including a plurality of longitudinally aligned depending tabs configured to align with the longitudinally aligned holes, the longitudinally aligned holes in the applique enabling the longitudinally aligned depending tabs to pass therethrough, and the longitudinally aligned depending tabs further configured to be aligned with, and engage, the at least one longitudinally extending channel in the upper surface of the elongated frame element, to sandwich at least a portion of the applique between the pad and the elongated frame element.

7. The accessory component of claim 6, wherein the accessory component comprises a step rail.

8. The accessory component of claim 6, wherein the applique comprises at least one of polished stainless steel or polished aluminum.

9. The accessory component of claim 6, wherein the elongated frame element includes an additional channel formed in the upper surface, and wherein the pad includes a plurality of depending tabs, wherein the depending tabs extend through the holes in the applique to engage in the additional channel.

10. The accessory component 6, wherein the elongated frame element includes an additional plurality of channels formed co-extensively with a length of the elongated frame element; and
    further including an additional resilient, metallic applique secured in specific ones of the additional plurality of channels adjacent a rear area of the elongated frame element.

* * * * *